United States Patent Office 3,833,586
Patented Sept. 3, 1974

3,833,586
1-(SUBSTITUTED BENZYL) - 2-(1H)PYRIMIDONES AND 1-(SUBSTITUTED BENZYL)TETRAHYDRO-2-(1H)PYRIMIDONES
Thomas J. Schwan, Norwich, Leroy J. Honkomp and Alan W. Castellion, Oxford, and Richard H. Burns, Norwich, N.Y., assignors to Morton-Norwich Products, Inc., Norwich, N.Y.
No Drawing. Continuation of abandoned application Ser. No. 128,143, Mar. 25, 1971. This application Feb. 6, 1973, Ser. No. 330,113
Int. Cl. C07d 51/38
U.S. Cl. 260—251 R
10 Claims

ABSTRACT OF THE DISCLOSURE

Certain 1-(substituted benzyl)tetrahydro-2-(1H)pyrimidones of the formula:

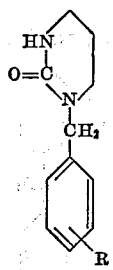

wherein R in the 4-position is carbomethoxy, carboxy, or carboxamido, and in the 3-position trifluoromethyl possess pharmacological activity as anticonvulsants and tranquilizers.

The corresponding 1-(substituted benzyl)-2-(1H) pyrimidones are useful intermediates in their preparation.

---

This is a continuation, of application Ser. No. 128,143, filed Mar. 25, 1971, now abandoned.

This invention relates to chemical compounds. In particular it is concerned with compounds of the formula:

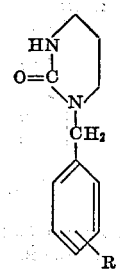

wherein the 4-position R is carbomethoxy, carboxy or carboxamido and in the 3-position trifluoromethyl. These compounds possess pharmacological activity affecting the central nervous system. When administered perorally to animals they exhibit anticonvulsant and tranquilizing action. Their anticonvulsant property is evidenced in the control of pentylenetetrazol induced convulsions in mice. An oral dose of 200 mg./kg. of these compounds to mice intravenously receiving 45 mg./kg. of pentylenetetrazol counteracts the convulsive property of pentylenetetrazol. Also a peroral dose of 200–1600 mg./kg. of these compounds to mice elicits a tranquilizing effect manifested by muscle relaxation and reduced spontaneous activity.

Included within this invention are compounds of the formula:

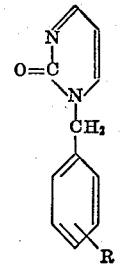

wherein R in the 4-position is carbomethoxy, carboxy, or carboxamido and in the 3-position trifluoromethyl which are useful in the preparation of compounds of formula (I).

The preparation of the compounds of this invention can be accomplished according to the following scheme:

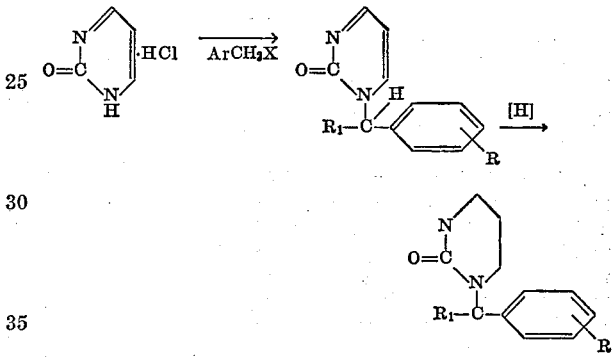

In this scheme $R_1$ is hydrogen and R has the significance previously ascribed, Ar is optionally substituted phenyl and X is halogen. The reaction sequence of this scheme is carried out using solvents inert to the reactants such as methanol and dimethylformamide. Reaction promotants such as potassium carbonate and alkali metal iodides are advantageous in effecting the condensation between the hydroxypyrimidine and the optionally substituted benzyl halide. Hydrogenation is preferably effected using catalytic quantities of platinum oxide or palladium on charcoal.

In order that this invention may be readily available to and understood by those skilled in the art the following examples are appended:

EXAMPLE I

Methyl p[(hexahydro-2-oxo-1-pyrimidinyl)methyl]benzoate

A. Methyl p-[(2-oxo-1-pyrimidinyl)methyl]benzoate

A 74 g. (0.56 mole) portion of 2-hydroxypyrimidine hydrochloride in 800 ml. of methanol was treated with 152 g. (1.12 mole) of $K_2CO_3$, 46 g. (0.28 mole) of KI and 127 g. (0.56 mole) of methyl p-bromomethylbenzoate. The reaction mixture was refluxed, with stirring, for 24 hr. and filtered. The filtrate was concentrated to dryness under reduced pressure. The residue was taken up in 500 ml. of water and extracted with $CHCl_3$. The $CHCl_3$ extract was dried over $MgSO_4$ overnight, filtered and concentrated to dryness to give 46 g. (34%) of the ester, a light yellow solid, m.p. 170–179°.

The aqueous phase of the extraction was adjusted to pH 3–4 with 100 ml. of concentrated HCl to give 74 g. (57%) of the acid, m.p. 242–249°.

The ester was recrystallized from 500 ml. of acetonitrile, m.p. 188–189°. Yield 28 g. (20%).

B. Methyl p-[(hexahydro-2-oxo-1-pyrimidinyl)methyl]benzoate

An 18 g. (0.074 mole) portion of A., 150 ml. of methanol and 0.2 g. of PtO₂ were placed in a 0.5 l. pressure bottle and subjected to hydrogenation at 40 p.s.i.g. The hydrogen uptake was 10# (theory: 13#) in 0.6 hr. The reduction mixture was diluted with 100 ml. of methanol, warmed, decolorized and filtered. The filtrate was concentrated to dryness under reduced pressure to give 18 g. (100%) of a light yellow solid, mp. 176–179°.

The product was recrystallized from 1.2 l. of acetonitrile, washed with acetonitrile, ether and dried, m.p. 177–180°. Yield: 10 g. (56%).

Anal.

Calcd. for $C_{13}H_{16}N_2O_3$: C, 62.89; H, 6.50; N, 11.29.
Found: C, 62.87; H, 6.48; N, 11.39.

EXAMPLE II p-[(Hexahydro-2-oxo-1-pyrimidinyl)methyl]benzamide

A. p-[(2-oxo-1-pyrimidinyl)methyl]benzamide

A solution of 26 g. (0.11 mole) of the compound of Example I, A. in 790 ml. of methanol and 910 ml. of concentrated ammonium hydroxide was stirred for 4 days at room temperature and filtered. The white crystalline solid was washed with water and air dried, m.p. 252–254°. Yield: 8 g. (32%).

The filtrate was concentrated to dryness to give 16 g. (64%) of a light yellow solid, m.p. 241–244°.

B. p-[(Hexahydro-2-oxo-1-pyrimidinyl)methyl]benzamide

A 24 g. (0.10 mole) portion of A., 150 ml. of methanol and 0.5 g. of PtO₂ were placed in a 0.5 l. pressure bottle and subjected to hydrogenation at 40 p.s.i.g. The hydrogen uptake was 17# (theory: 18#) in 4 hr. The reduction mixture was warmed, decolorized and filtered. The filtrate was concentrated under reduced pressure to give 24 g. (100%) of a white crystalline product, m.p. 184–187°.

The product was recrystallized from 3.7 l. of acetonitrile, washed with acetonitrile, ether and dried, m.p. 194–210°. Yield: 18 g. (75%).

Anal.

Calcd. for $C_{12}H_{15}N_3O_2$: C, 61.78; H, 6.48; N, 18.02.
Found: C, 62.05; H, 6.67; N, 17.63.

Example III 1-(m-Trifluoromethylbenzyl)-3,4,5,6-tetrahydro-2(1H)-pyrimidone

A. 1-(m-Trifluoromethylbenzyl)-2(1H)-pyrimidone

A 17.0 g. (0.128 mole) portion of 2-hydroxypyrimidine hydrochloride in 75 ml. of methanol was treated with 35.5 g. (0.258 mole) of K₂CO₃, 10.6 g. (0.064 mole) of KI and 25.0 g. (0.128 mole) of α-chloro-3-trifluoromethyl toluene. The reaction mixture was refluxed for 20 hrs. and concentrated to dryness under reduced pressure. The residue was taken up in 200 ml. of water and extracted with 250 ml. of chloroform. The chlorofrom extract washed with H₂O, dried over MgSO₄ (Darco) and filtered. The filtrate was concentrated under reduced pressure to give 31 g. (95%) of a tacky white solid. The crude product was crystallized using 50 ml. of toluene, m.p. 85–88°. Yield 12.9 g. (40%).

B. 1-(m-Trifluoromethylbenzyl)-3,4,5,6-tetrahydro-2(1H)-pyrimidone

A 12.9 g. (0.051 mole) portion of 1-(m-trifluoromethylbenzyl)-2(1H)pyrimidone, 150 ml. of methanol, and 0.3 g. of PtO₂ were placed in a 0.5 l. pressure bottle and subjected to hydrogenation at 40 p.s.i.g. The hydrogen uptake was 111# (theory: 102#) in 1 hr. The reduction mixture was warmed, decolorized, filtered and concentrated to dryness, under reduced pressure to give 12.9 g. (99%) of an off-white solid, m.p. 93–97°.

The product was recrystallized from 300 ml. of acetonitrile, m.p. 97–99°. Yield: 8.6 g. (66%).

EXAMPLE IV p-[(Hexahydro-2-oxo-1-pyrimidinyl)methyl]benzoic acid

A 35 g. (0.15 mole) portion of p-[(2-oxo-1-pyrimidinyl)methyl]benzoic acid, 150 ml. of methanol and 0.4 g. of PtO₂ were placed in a 0.5 l. pressure bottle and subjected to hydrogenation at 40 p.s.i.g. The hydrogen uptake was 23# (theory: 26#) in 5.5 hr. The reduction mixture was warmed, decolorized, filtered and concentrated to dryness under reduced pressure. The off-white solid was taken up in 500 ml. of water. The pH of the solution was adjusted to pH 7–8 with 125 g. of NaaHCO₃, resulting in complete solution. The solution was filtered, adjusted to pH 3–4 with 160 ml. of acetic acid, stirred 1 hr. and filtered. The white crystalline solid was washed with 200 ml. of water, air dried and dried in a 60° oven for 6 hrs., m.p., 227–230°. Yield: 25 g. (72%).

Anal.

Calcd. for $C_{12}H_{14}N_2O_3$: C, 61.53; H, 6.02; N, 11.96.
Found: C, 61.64; H, 6.02; N, 11.80.

What is claimed is:

1. A compound of the formula:

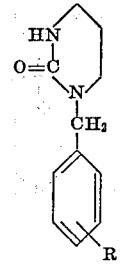

wherein R is in the 4-position carbomethoxy, carboxy or carboxamido and in the 3-position trifluoromethyl.

2. The compound of Claim 1 wherein R is 3-trifluoromethyl.
3. The compound of Claim 1 wherein R is 4-carbomethoxy.
4. The compound of Claim 1 wherein R is 4-carboxy.
5. The compound of Claim 1 wherein R is 4-carboxamido.
6. A compound of the formula:

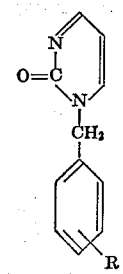

wherein R is in the 4-position carbomethoxy, carboxy or carboxamido and in the 3-position trifluoromethyl.

7. The compound of Claim 6 wherein R is 4-carbomethoxy.
8. The compound of Claim 6 wherein R is 4-carboxy.
9. The compound of Claim 6 wherein R is 4-carboxamido.
10. The compound of Claim 6 wherein R is 3-trifluoromethyl.

References Cited

UNITED STATES PATENTS 3,681,349   8/1972   Schwan et al. .......... 260—251 R

RAYMOND V. RUSH, Primary Examiner

U.S. Cl. X.R.

260—256.4 C, 999